United States Patent [19]

Steckel

[11] 4,131,554

[45] * Dec. 26, 1978

[54] OVERBASED BRIDGED PHENOL METAL SALT/HALO CARBOXYLIC ACID CONDENSATE ADDITIVES FOR LUBRICANTS

[75] Inventor: Thomas F. Steckel, Chagrin Falls, Ohio

[73] Assignee: The Lubrizol Corporation, Wickliffe, Ohio

[*] Notice: The portion of the term of this patent subsequent to Dec. 5, 1995, has been disclaimed.

[21] Appl. No.: 857,839

[22] Filed: Dec. 5, 1977

Related U.S. Application Data

[63] Continuation-in-part of Ser. No. 608,380, Aug. 27, 1975, Pat. No. 4,067,698.

[51] Int. Cl.$^2$ .................. C10M 1/54; C10M 3/48; C10M 5/28; C10M 7/52

[52] U.S. Cl. .................. 252/33.6; 252/42.7; 252/388

[58] Field of Search ............ 252/33.6, 42.7, 389 R

[56] References Cited

U.S. PATENT DOCUMENTS

| | | | |
|---|---|---|---|
| 4,061,474 | 12/1977 | Steckel | 252/42.7 |
| 4,067,698 | 1/1978 | Steckel | 252/42.7 |

Primary Examiner—Irving Vaughn
Attorney, Agent, or Firm—James W. Adams, Jr.; Daniel N. Hall

[57] ABSTRACT

Compositions made by reacting (I) a metal phenoxide salt of a bridged phenol of 2 to about 20 phenol groups and (II) a carboxylic acid reagent containing from one to three carboxyl-based groups and a halogen-substituted hydrocarbon-based aliphatic or alicyclic group containing a halogen atom are useful as additives for lubricants and normally liquid fuels. Analogous thiophenoxide-based compositions are similarly useful. These compositions can also be used as intermediates for the preparation of other useful additive compositions through their reaction with alcohols, amino compounds, reactive small ring heterocycles and basically reacting metal compounds.

21 Claims, No Drawings

OVERBASED BRIDGED PHENOL METAL SALT/HALO CARBOXYLIC ACID CONDENSATE ADDITIVES FOR LUBRICANTS

REFERENCE TO RELATED APPLICATIONS

This application is a continuation-in-part of U.S. Ser. No. 608,380 filed Aug. 27, 1975 now U.S. Pat. No. 4,067,698.

BACKGROUND OF THE INVENTION

1. Field of the Invention

This invention relates to additive compositions for use in lubricants and normally liquid fuels. More particularly, it relates to compositions prepared by reacting metal phenoxide salts of bridged phenols with carboxylic acid reagents having halogen-bearing aliphatic or alicyclic groups. The invention also pertains to oil-based lubricant, normally liquid fuel and additive concentrate compositions containing these additive compositions. Products of the post-treatment of these compositions with amines, alcohols, small ring heterocycles and metal salts are also useful as additives for oil-based lubricants and normally liquid fuels and are within the scope of this invention as are fuel, lubricant and concentrate compositions containing them.

2. Prior Art

Nonylphenoxy acetic acid is known as an effective anti-corrosion agent for a variety of petroleum-based fluids and synthetic lubricants such as silicones. See for example, "Corrosion", Volume 16, pages 17–19 (1960).

Certain imidazoline or diamine salts of alpha substituted acetic acids of the formula:

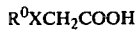

$$R^0XCH_2COOH$$

wherein X is oxygen, sulfur or an amino group, and $R^0$ is an alkaryl, etc., group, are described as anti-corrosion agents for lubricants and normally liquid fuels in U.S. Pat. No. 3,775,320.

3. General Background

The ability of a lubricant or normally liquid fuel to inhibit corrosion of metals with which it comes in contact is becoming an increasingly sought-after property in these days of material shortages, spiraling equipment replacement costs, and environmental consciousness. Such anti-rust and/or anti-corrosion properties are usually enhanced in lubricants or normally liquid fuels through use of additive organic compounds.

The ability of lubricants and normally liquid fuels to remove from metal surfaces and disperse sludge which accumulates during storage or use of a lubricant or fuel is also a highly desirable property since it allows more efficient utilization of the lubricant or fuel and prevents equipment breakdowns and deterioration. It is also desirable for a fuel or lubricant to possess properties which prevent or at least inhibit the accumulation of varnish (resinous oxidation products) on interior engine parts such as pistons, cylinder walls and the like. Such properties are also usually obtained through the addition of organic additives to the lubricant or fuel.

The compositions of this invention and post-treated compositions made from them are useful as anti-rust and anti-corrosion additives and can impart useful detergent, dispersant, and varnish-inhibiting properties to compositions containing them.

4. Objects

Therefore, it is an object of this invention to provide additive compositions that will impart useful and desirable properties to oil-based lubricants and normally liquid fuels containing them. More specifically, it is an object of this invention to provide compositions that will function in lubricants and fuels as anti-rust, anti-corrosion, anti-sludge or varnish-inhibiting agents. It is a further object to provide novel concentrates, lubricants and fuels containing the additive compositions. Other objects will be apparent to those skilled in the art upon review of this specification.

SUMMARY OF THE INVENTION

The above-stated objects are accomplished with the present invention by reacting (I) at least one phenoxide metal salt of a bridged phenol having (a) at least 2 and up to about 20 phenolic moieties or thiophenol analogs thereof and (b) at least 1 to about 19 bridging linkages independently selected from the group consisting of covalent carbon-to-carbon single bonds, ether linkages, sulfide linkages, polysulfide linkages of two to six sulfur atoms, sulfinyl linkages, sulfonyl linkages, methylene linkages, alkylene linkages, di(lower alkyl)methylene linkages, lower alkylene ether linkages, lower alkylene sulfide linkages, lower alkylene polysulfide linkages of two to six sulfur atoms, amino linkages, polyamino linkages and mixtures of said divalent bridging linkages with (II) at least one carboxylic acid reagent having 1 to about 3 carboxyl-based groups and a halogen-substituted hydrocarbon-based aliphatic or alicyclic group containing a halogn atom.

Post-treated compositions made by further reaction of these inventive compositions with mono- or polyhydric alcohols, basically reacting metal compounds, amino compounds such as mono-amines, hydrazines, hydroxyamines, polyamines, hydroxypolyamines and small ring heterocycles are also within the scope of the invention as are lubricants, normally liquid fuel and additive concentrates containing these compositions and post-treated compositions.

DETAILED DESCRIPTION OF THE INVENTION (I) The phenoxide metal salt of a bridged phenol:

The bridged metal phenoxides used in the present invention have (a) at least 2 and up to about 20 phenolic moieties or thiophenol analogs thereof and (b) at least 1 to about 19 bridging linkages independently selected from the group consisting of covalent carbon-to-carbon signal bonds, ether linkages, sulfide linkages, polysulfide linkages of two to six sulfur atoms, sulfinyl linkages, sulfonyl linkages, methylene linkages, alkylene linkages, di(lower alkyl)methylene linkages, lower alkylene ether linkages, lower alkylene sulfide linkages, lower alkylene polysulfide linkages of two to six sulfur atoms, amino linkages, polyamino linkages and mixtures of said divalent bridging linkages.

The terms "phenol", "phenolic", "phenoxide", etc. are used in this specification in a generic sense to signify a hydroxy aromatic compound having one or more (fused if more then one ring) carbocyclic rings and a hydroxyl group (or salt thereof) bonded direct to a ring carbon. Generally, the phenolic moieties of the bridged phenoxides used in this invention have mononuclear or fused binuclear aromatic rings having 6 or 10 carbon atoms and are hydrocarbon-based in the sense discussed below.

Preferably, the phenoxide metal salts of this invention contain one or more phenolic moieties substituted with 1 to 3, preferably 1, hydrocarbon-based aliphatic or alicyclic groups of from 1 to about 300, preferably about 30 to about 250, carbon atoms.

As used herein, and in the appended claims, the term "hydrocarbon-based group" denotes a group directly bonded through carbon atom to another portion of the molecule (e.g., in (I), an aromatic nucleus) and having a predominately hydrocarbon character within the context of this invention. Such groups include the following:

(1) Purely hydrocarbon groups, that is, aliphatic (e.g., alkyl or alkenyl), or alicyclic (e.g., cycloalkyl or cycloalkenyl), and the like, as well as cyclic groups wherein the ring is completed through another portion of the molecule (that is, any two indicated substituents may together form an alicyclic group or aliphatic- or alicyclic-substituted groups). Such groups are known to those skilled in the art; examples include (in addition to those noted hereinafter) $C_{30}H_{61}$—(all isomers), $C_{40}H_{79}$—(all isomers),

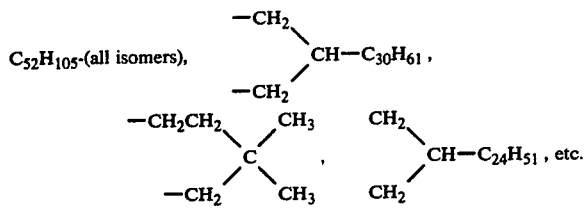

(2) Substituted hydrocarbon groups, that is, groups containing non-hydrocarbon substituents which, in the context of this invention, do not alter the predominantly hydrocarbon character of the group. Those skilled in the art will be aware of suitable substituents which include groups and atoms such as:

pendant ether substituents (especially hydrocarbyloxy and particularly alkoxy substituents of up to ten carbon atoms);

pendant thioether substituents (especially $C_{1-10}$ alkyl thioethers such sas methylmercapto, butylmercapto, etc.)

pendant oxo groups (especially

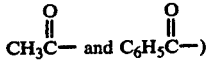

pendant hydrocarbyl sulfonyl substituents ($-SO_2R''$ where $R''$ is a $C_{1-10}$ hydrocarbyl group)

pendant carbo-oxyhydrocarbyl (e.g., $-C(O)OR''$, $R''$ being as above) and the analogous acyloxyhydrocarbyl substituents (e.g., $-O(O)CR''$, $R''$ being as above) pendant sulfinyl substituents ($-S(O)R''$, $R''$ being as above)

Many other such non-hydrocarbyl substituents will be apparent to those skilled in the art.

Also included within the scope of substituted hydrocarbon groups for the purpose of describing this invention are hydrocarbon groups having linkages in their main chains analogous to the pendant ether, thioether, oxo, sulfonyl and sulfinyl substituents described immediately hereinabove.

(3) Hetero groups; that is, groups which while predominately hydrocarbon in character within the context of this invention, contain atoms other than carbon present in a ring otherwise composed of carbon atoms. Suitable hetero atoms will be apparent to those skilled in the art and include, for example, oxygen, sulfur (in both its oxidized and unoxidized forms) phosphorus and nitrogen. Such hetero groups include, for example, furyl, thienyl, pyranyl, pyrrolyl, dihydro-imidazolyl, pyridyl, pyrazolyl; pyrazolinyl, indolyl, piperidyl, piperazinyl, morpholinyl, morpholino, and their hydrocarbon substituted analogs (e.g., 4-n-hexyl pyridinyl).

In general, the hydrocarbon-based groups of the phenoxide moieties of the salts used in this invention contain no more than about three of the hereinabove-described non-hydrocarbon substituents or hetero atoms, and preferably, no more than one for each 10 carbon atoms in the hydrocarbon-based group. They also in general contain no more than one unsaturated carbon-to-carbon linkage per every 10 saturated carbon-to-carbon linkages.

Generally, the hydrocarbon-based group in the phenoxide moieties of the salts used in this invention are purely hydrocarbyl and aliphatic or alicyclic in nature. Preferably, they are purely aliphatic in nature and more preferably, they are saturated aliphatic groups (i.e., containing no more than 1 carbon-to-carbon unsaturated linkage for every 20 carbon-to-carbon single bond linkages.)

The sources of the hydrocarbon-based groups include principally the high molecular weight substantially saturated petroleum fractions and substantially saturated olefin oligomers and polymers, particularly oligomers and polymers of mono-olefins having from 2 to about 30 carbon atoms. The especially useful polymers are the homopolymers of 1-mono-olefins such as ethylene, propene, 1-butene, isobutene, 1-hexene, 1-octene, 2-methyl-1-heptene, 3-cyclo-hexyl-1-butene, 2-methyl-5-propyl-1-hexene, 1-dodecene, 1-tetradecene, 1-octadecene, 1-cosene, 1-tetracosene, etc.

Homopolymers of medial olefins, i.e., olefins in which the olefinic linkage is not at the terminal position, likewise are useful. They are illustrated by 2-butene, 3-pentene, and 4-octene. Mixtures of these homopolymers such as a mixture of poly(propene) and poly(1-decene) can also serve as the source of the hydrocarbon-based groups.

Also useful are the interpolymers of the olefins, such as those mentioned above with other interpolymerizable olefinic substances such as aromatic olefins, cyclic olefins, and polyolefins. Such interpolymers include, for example, those prepared by polymerizing isobutene with styrene; isobutene with butadiene; propene with isoprene; ethylene with piperylene; isobutene with 1-tetradecene; isobutene with p-methyl styrene; 1-hexene with 1,3-hexadiene; 1-octene with 1-hexene; 1-heptene with 1-pentene; 3-methyl-1-butene with 1-octene; 3-3-dimethyl-1-pentene with 1-hexene; isobutene with styrene and piperylene; etc.

Mixtures of such interpolymers as well as mixture of one or more interpolymer with one or more hompolymer can also serve as the source of the hydrocarbon-based group.

Specific examples of such interpolymers include copolymer of 95% (by weight) of isobutene with 5% of styrene; terpolymer of 98% of isobutene with 1% of piperylene and 1% of chloroprene; terpolymer of 95% of isobutene with 2% of 1-butene and 3% of 1-hexene; terpolymer of 60% of isobutene with 20% of 1-pentene and 20% of 1-octene; copolymer of 80% of 1-hexene and 20% of 1-heptene; terpolymer of 90% of isobutene with 2% of cyclohexene and 8% of propene; and copolymer of 80% of ethylene and 20% of propene. Especially preferred sources of the hydrocarbon-based groups of this invention are homo- and interpolymers of the various butenes (i.e., isobutene, 1- and 2- butene and mixtures thereof). Particularly preferred sources are such butene polymers wherein isobutene units

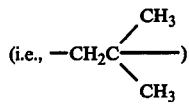

predominate, preferably to the extent of about 80% of the units in the molecule. Other preferred polymers are $C_{3-16}$ alpha olefin polymers and interpolymers including ethylene interpolymers.

Another source of the hydrocarbon-based groups are saturated aliphatic hydrocarbons such as highly refined high molecular weight white oils or synthetic alkanes such as are obtained by hydrogenation of the high molecular weight olefin polymers discussed above or other high molecular weight olefinic substances. Halogenated analogs (particularly chlorinated and brominated analogs) of the hydrocarbon group sources just discussed can also serve as sources of the hydrocarbon-based groups in the phenol moieties of the bridged phenoxides of this invention.

The use of olefin polymers having number average molecular weights of about 750-5000 is preferred (as measured by gel permeation chromatography or vapor pressure osmometry).

A preferred class of bridged phenols that can be used in the present invention is represented by the general formula:

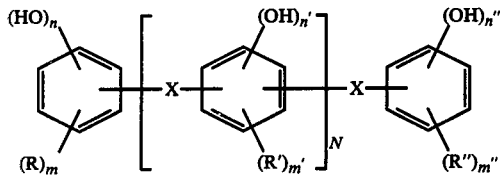

wherein n, n' and n" are each independently integers of 1-3 but preferably 1 each; R, R' and R" are each independently aliphatic hydrocarbon-based groups, generally, alkyl or alkenyl groups, of one to about 300 carbon atoms, preferably about 6 to 200 carbon atoms each, and usually about 30 to 250 carbon atoms each; m, m' and m" are each independently integers of 0-3, but generally 1 or 2 each; N is an integer of 0-20 but usually 0-5; and X is a divalent bridging linkage selected from the group consisting of covalent carbon-to-carbon single bonds, ether linkages, sulfide linkages, polysulfide linkages of two to six sulfur atoms, sulfinyl linkages, sulfonyl linkages, methylene linkages, alkylene linkages, di(lower alkyl)methylene linkages, lower alkylene ether linkages, lower alkylene sulfide linkages, lower alkylene polysulfide linkages of two to six sulfur atoms, amino linkages, polyamino linkages and mixtures of said divalent bridging linkages. The divalent bridging linkage more preferably will be a lower alkylene linkage of up to seven carbon atoms, and particularly preferably a methylene linkage, $-CH_2-$, or a sulfide or polysulfide radical of the general formula $-S_z-$ where z has an average value of 1 to 6, usually 1 to 4. The bridging can also be a divalent amino-containing radical of the formulae such as

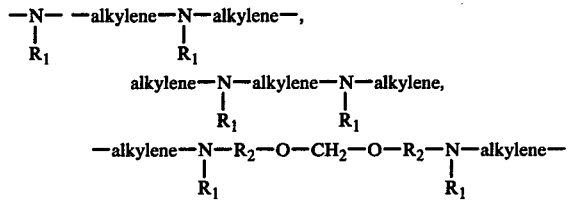

where the alkylene groups are lower alkylene of 1 to about 10 carbons, usually methylene, $R_1$ is hydrogen or lower alkyl group, and $R_2$ is a divalent hydrocarbon group having up to seven carbon atoms, usually an alkylene group.

These bridged phenols and their neutral and basic metal salts are known and can be prepared by many conventional processes as shown by the following U.S. Patent numbers which are expressly incorporated herein by reference for their disclosure of the preparation of various bridged phenols and their metal salts:

| | | |
|---|---|---|
| 2,250,188 | 2,472,518 | 3,014,868 |
| 2,280,419 | 2,647,873 | 3,057,800 |
| 2,340,036 | 2,680,097 | 3,259,551 |
| 2,375,222 | 2,711,947 | 3,336,226 |
| 2,410,911 | 2,725,358 | 3,338,063 |
| 2,415,833 | 2,736,701 | 3,429,812 |
| 2,445,736 | 2,786,030 | 3,454,497 |
| 2,445,737 | 2,810,697 | 3,474,035 |
| 2,459,113 | 2,833,719 | 3,539,633 |
| 2,459,114 | 2,920,105 | 3,793,201 |
| 2,472,517 | 2,957,908 | 3,873,627 |

Among the preferred metal salts of bridged phenols are those selected from the class of neutral metal salts of the condensation products of aliphatic hydrocarbon-substituted phenols and lower aliphatic aldehydes containing up to seven carbon atoms. The aliphatic hydrocarbon substituents on the phenols used in preparing such condensation products should provide a total of at least six aliphatic carbon atoms per molecule of phenol and preferably, a total of at least eight aliphatic carbon atoms per molecule. Each aliphatic hydrocarbon substituent may contain from about four to about 250 or more aliphatic carbon atoms but generally will contain from about six to about 100 aliphatic carbon atoms. The aliphatic aldehyde used in the formation of these phenol aldehyde condensation products is preferably formaldehyde or a reactive equivalent thereof such as formalin, trioxane or paraformaldehyde. Other suitable aldehydes include acetaldehyde, crotonaldehyde, butyraldehyde, propionaldehyde, and the like. Examples of the preparation of the metal salts of phenol-aldehyde condensation products is found in many of the above-incorporated patents, for example, U.S. Pat. No. 2,647,873.

Methods for making the metal phenoxides from the corresponding phenols are well known to those of skill in the art and need not be dealt with in detail here. For example, phenoxides can be produced by reaction of the pure metal or a hydroxide, oxide or hydride thereof, with the free phenols.

Methods for attaching hydrocarbon-based groups to the aromatic nuclei of bridged phenoxides (or phenol precursors) are equally well known in the art. For example, the production of phenols substituted with aliphatic-based groups is described in the article entitled "Alkylation of Phenols" in Kirk-Othmer "Encyclopedia of Chemical Technology", Second Edition, Volume 1, pages 894–895, Interscience Publishers a division of John Wiley and Company, 1963. Other equally appropriate and conveninet techniques for the production of phenoxides useful in this invention will occur readily to those skilled in the art. The hydrocarbon groups can be introduced either before or after introduction of the bridging linkages between the phenolic nuclei. Preferably, however, they are introduced before.

(II) The carboxylic acid reagent.

The carboxylic acid reagents used to produce the additive compositions of the present invention have 1 to 3 carboxyl-based groups, and contain a halogen-substituted hydrocarbon-based aliphatic or alicyclic group, that is a group having a halogen atom attached directly to an aliphatic or alicyclic carbon atom, i.e., a carbon atom that is part of an aliphatic or alicyclic group. The use of these terms does not necessarily mean that the carboxylic acid reagent is solely or even predominantly aliphatic or alicyclic in character. For example, 1-chloro-1-phenyl acetic acid contains a chlorine atom attached to an aliphatic carbon atom (i.e., the benzyl carbon atom), but the predominance of carbon atoms in the molecule are aryl in nature. Similarly, 5-bromo-(1-naphthyl)3-cyclohexene carboxylic acid contains a predominance of aryl carbon atoms, but the bromine atom is attached to an alicyclic carbon atom.

Preferably, in these carboxylic acid reagents, the halogen atom is chlorine or bromine; generally, it is bonded to a carbon atom which is not directly doubly bonded to another carbon atom. More preferably, the chlorine or bromine atom is bonded to a carbon alpha to at least one of the carboxyl-based groups present. There are one to three halogen atoms, preferably one, present in the acid reagent molecule.

Generally, these carboxylic acid reagents contain only carboxyl-based groups (as described hereinbelow) and the halogen-bearing and alicyclic group. Preferred reagents are of the formula

$A\text{-}(Cox)_{1-3}$ wherein A represents a halogenated, hydrocarbon-based aliphatic or alicyclic group of 1 to about 20 carbon atoms having a number of unsatisfied valences corresponding to the number of Cox groups present, and each Cox independently represents a carboxyl-based group. Exemplary of such A groups are chloro- and bromomethyl 1- and 2-chloro- and bromomethyl; 1-, 2- and 3-chloro- and bromopropyl, etc.; 1-, 2-, 3- etc., chloro-and bromocyclopentyl and cyclohexyl groups are also exemplary of the A group.

"Carboxyl-based" groups include free carboxylic acid groups, as well as carboxylic anhydride groups, carboxylate groups of any of the metal discussed hereinabove in relation to the metal phenoxides, carboxylic acid ester groups of mono- and polyhydric alcohols as discussed hereinbelow and carboxylic acid nitrogen-containing groups such as carboxamide and ammonium carboxylate groups of the amino compounds discussed hereinbelow.

Means for obtaining carboxylic acid reagents useful in this invention are well known to those of ordinary skill in the art. Many are commercially available chemicals, others can be readily prepared from such commercially available chemicals by reactions and techniques well known to the art. See, for example, Kirk-Othmer, "Encyclopedia of Chemical Technology", Second Edition, Volume 1, Pages 224 et seq., John Wiley & Sons, Inc., N.Y., N.Y., 1965.

The preferred acid reagents are esters, amides and metal and/or ammonium salts; salts and esters are particularly preferred.

Generally, these preferred acid reagents have from 1 to 2 carboxyl-based groups and they are substantially free of ethylenic or acetylenic unsaturation (i.e., having no more than one such unsaturated carbon-carbon double bond for every 10 carbon-carbon single bonds).

The alcohols which can be used to form the ester carboxylic acid reagents useful in making the compositions of this invention can be relatively simple lower mono- or dihydric hydrocarbon-based alcohols such as methanol, ethanol, the propanols, butanols, pentanols, hexanols, heptanols, including both their aliphatic and alicyclic isomers; ethylene-, propylene-, butylene-, pentylene-, hexylene-, and heptylene-glycols wherein the 2 hydroxyls are separated by 2 carbon atoms; including both their aliphatic and alicyclic isomers are also useful. Tri-, tetra-, penta-, hexa-, and heptamethylene glycols and hydrocarbon-substituted analogs thereof containing a total of less than 8 carbon atoms (e.g., 2-ethyl-1,3-trimethylene glycol, etc.) including their alicyclic and aliphatic analogs can be used. Phenol and the various dihydric benzene compounds (e.g., resorcinol and the hydroquinones) as well as the various cresols and hydroxyl-substituted cresols and benzyl alcohol and hydroxyl-substituted analogs thereof where the second hydroxyl group is directly bonded to an aromatic carbon (e.g., 3-HO-$\Phi CH_2OH$ wherein $\Phi$ is a divalent benzene ring) can also be used. In this specification, the term "lower alcohols" refers to alcohols which contain one or two hydroxyl groups and one to seven carbon atoms. Mono- and dihydric alkanols are preferred.

The carboxylic acid ester reagents useful in making the compositions of this invention can also be made from relatively higher mono- and polyhydric hydrocarbon-based alcohols. In this specification, the term "higher alcohols" refers to alcohols which contain either 8 or more carbon atoms and/or 3 or more (up to 8) hydroxyl groups. Preferably they contain 8 to about 30 carbon atoms and 1 to about 6 hydroxyl groups. The higher alcohols can be aliphatic, alicyclic, mixed aliphatic alicyclic (e.g., pentyl cyclohexyl), aromatic (e.g., the naphthanols, benzohydroquinones, and phenyl-phenols), mixed aliphatic-aromatic (e.g., beta phenyl ethanol, 3-phenyl propanol, etc. as well as the ethyl-, n-decyl-, n-pentadecyl-phenols, etc.) and alicyclic-aromatic (e.g., the cyclohexyl phenols, phenyl cyclohexanols, etc.) monohydric alcohols.

Exemplary of the monohydric higher alcohols are the octanols, nonanols, decanols, hexadecanols, etc. as well as the so-called fatty alcohols and their mixtures, excluding hexanols and heptanols, which are discussed in detail under the title "Higher Fatty Alcohols" in Kirk-Othmer, "Encyclopedia of Chemical Technology", Second Edition, John Wiley and Sons, N.Y., 1965, Vol. 1, pages 542–557. Among such alcohols are those known as lauryl, myristyl, cetyl, stearyl and behenyl alcohols.

Fatty alcohols containing minor amounts of unsaturation (e.g., no more than two carbon-to-carbon unsaturated bonds per molecule) are also useful and are exemplified by palmitoleyl ($C_{16}H_{32}O$), oleyl ($C_{18}H_{36}O$) and eicosonyl ($C_{20}H_{40}O$) alcohols.

Higher synthetic monohydric (excluding $C_6$ and $C_7$ alcohols) alcohols such as formed by the Oxo process (e.g., 2-ethyl hexyl), the aldol condensation, and by aluminum organic (e.g., Aluminum triethyl) -catalyzed oligomerization of alpha olefins (especially ethylene) followed by oxidation are also useful. These higher synthetic alcohols are discussed in detail in the hereinabove cited "Encyclopedia of Chemical Technology", Vol. 1, at pages 560-569, which is hereby incorporated by reference for disclosures relating to higher synthetic alcohols.

Higher polyhydric alcohols containing either more than seven carbon atoms or at least 3 hydroxyl groups (and preferably up to about 8 hydroxyl groups) can also be used in making the ester carboxylic reagents of this invention. Preferably, these higher polyhydric alcohols have both more than seven carbon atoms and at least 3 hydroxyls, although some of the dihydric glycol ethers (described hereinbelow) contain only 2 hydroxyl groups, but are nevertheless useful.

Among the higher hydrocarbon-based polyhydric alcohols are the sugar alcohols of the general formula $HOCH_2(CHOH)-C_{2-5}CH_2OH$ such as erythritol, sorbitol, mannitol, etc., such sugar alcohols are described in detail at pages 569-588 of Vol. 1 of the "Encyclopedia of Chemical Technology" referred to hereinabove.

The various methylol polyols such as pentaerythritol and its oligomers (tripentaerythritol, etc.) as well as polyols such as trimethylolethylol and trimethylolpropane are also useful.

The higher dihydric glycols of the general formula $HO(Alk-O)_{1-20}H$ wherein the total number of carbon atoms in all the "Alk" groups is greater than 7 and less than about 30, can also be used in making the ester carboxylic acid reagents used in this invention. Exemplary of such glycols are the tetra and higher ethylene glycols, tripropylene glycol, dibutylene glycol, dipentylene glycol, dihexylene glycol, diheptylene glycol, and simple diols having greater than 7 carbon atoms such as 2,2,4-trimethyl 1,3-pentanediol, 1,4-cyclohexane dimethylol and 2,2,4,4-tetramethyl 1,3-cyclobutane diol. Various polymethylene diols such as 1,10-decamethane diol (i.e., 1,10-decanediol and its higher homologs are also useful.

Mixtures of two or more of the hereinabove discussed lower and/or higher alcohols can also be used to make the carboxylic acid reagent and are often preferred for reasons of economy and/or commercial availability. Generally, all isomers of the above-named alcohols are useful.

The carboxylic acid reagents used in this invention can be a nitrogen-containing carboxylic acid reagent made from one or more amino compounds. Generally, these amino compounds result in the carboxyl-based group Cox being a carboxamide although more complex groups such as carboximide

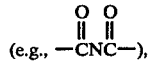
(e.g., $-CNC-$), or carboxamidine

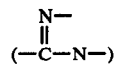

groups can be present.

Useful amino compounds from which the carboxylic and reagent can be derived are selected from the group consisting of amines, hydroxy amines, heterocyclic amines, polyamines, hydrazines, organically substituted hydrazines, hydroxyl amines, and ammonia. Among the amines useful in preparing the carboxylic acid reagents are monoamines. The monoamines can be primary, secondary or tertiary. Preferably, however, they are primary or secondary, i.e., they contain a

linkage; more preferably they contain a primary amino group. These amines are substituted with $C_1$-$C_{30}$ hydrocarbyl groups, hydrocarbon-based groups or hydroxy-substituted hydrocarbyl groups. Generally, these groups each contain between 1 and 10 carbon atoms and are aliphatic in nature.

The hydrocarbyl groups of these monoamines can each be independently selected from aliphatic, alicyclic, aromatic groups (including aliphatic- and alicyclic-substituted aromatic groups and aromatic-substituted aliphatic and alicyclic groups). Specifically among these amines, can be, for example, methyl amine, ethyl amine, diethyl amine, 2-propyl amine, n-butyl amine, di-n-butyl amine, isobutyl amine, coco amine, stearyl amine, lauryl amine, dimethyl lauryl amine, diethyl lauryl amine, oleyl amine, aniline, paramethyl aniline, diphenyl amine, benzyl amine, tolyl amine, methyl-2-cyclohexyl amine, etc. Mixtures of such amines can also be used.

Among the hydroxy amines which can be used to make the carboxylic acid reagents of the present invention are the hydroxy-hydrocarbyl-substituted analogs of the afore-described monoamines such as ethanol amine, di-3-propanol amine, 4-hydroxybutyl amine, triethanol amine, n-methyl-2-propyl amine, 3-hydroxy aniline, etc. While it is preferred that such hydroxy amines contain only one hydroxyl group per molecule, those containing more, such as diethanol amine and tris(hydroxymethyl)methyl amine are also suitable for use in this invention. Naturally when such hydroxy amines are used, the carboxyl acid reagent can comprise mixtures of esters and ammonium carboxylates and/or carboxamides. Such mixtures are useful in this invention.

Heterocyclic amines are also useful in preparing the acid reagents (II) used to make the compositions of this invention. The cycle can also incorporate unsaturation and can be substituted with alkyl, alkenyl, aryl, alkaryl or aralkyl groups. In addition the cycle can also contain other heteroatoms such as oxygen and sulfur or other nitrogen atoms including those not having nitrogen atoms bonded to hydrogen atoms. Generally, these cycles have 3 to 10, preferably 5 to 6 ring members. Among such heterocycles are substituted and unsubstituted aziridines, azetidines, azolidines, tetra- and dihydropyridines, pyrroles, piperidines, imidazoles, indoles, di- and tetrahydroimidazoles, piperazines, isoindoles, purines, morpholines, thiomorpholines, N-aminoalkyl morpholines, N-aminoalkyl thiomorpholines, azepines, azocines, azoinines, azecinines and tetra-, di- and perhydro-derivatives of each of the above.

Polyamides are also useful in preparing nitrogen-containing carboxylic acid reagents useful in this invention. Among these polyamines are alkylene polyamines including those conforming in the most part to the formula

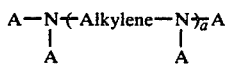

wherein a is an average of integers between 1 and about 10, preferably between 2 and 8; each A is independently a hydrogen atom, a hydrocarbyl group or a hydroxy-substituted hydrocarbyl group having up to about 30 atoms. Generally A is an aliphatic or hydroxysubstituted-aliphatic group of up to about 10 carbon atoms. "Alkylene" is an alkylene group having between 1 and 10, preferably 2 to 6, carbon atoms. Especially preferred are the alkylene polyamines where each A is hydrogen with such ethylene polyamines being the most preferred. Such alkylene amines include ethylene polyamines, butylene polyamines, propylene polyamines, pentylene polyamines, hexylene polyamines, heptylene polyamines, etc. (wherein successive amino groups are separated by two carbon atoms). The higher homologs of such amines and related heterocyclic amines such as piperazines and aminoalkyl-substituted piperizines are also included. Polymethylene amines (e.g., trimethylene amine) are also useful in making carboxylic acid reagents.

Polyamines useful in this invention are exemplified specifically by: ethylene diamine, triethylene tetramine, tetraethylene pentamine, pentaethylene hexamine, tris(2-aminoethyl)amine, propylene diamine, trimethylene diamine, decamethylene diamine, octamethylene diamine, di(heptamethylene)amine, propylene diamine, di(heptamethylene)triamine, tripropylene tetramine, di(trimethylene)triamine, 2-heptyl-3-(2-aminopropyl-)imidazoline, 4-methylimidazoline, 1,3-bis-(2-aminoethyl)imidazoline, pyrimidine, 1-(2-aminopropyl)piperazine, 1,4-bis(2-aminoethyl)piperazine, 2-methyl-1-(2-aminobutyl) piperazine, etc. Higher homologs are obtained by condensing two or more of the above-illustrated alkylene amines are likewise useful as are mixtures of two or more of the afore-described polyamines.

Ethylene polyamine, as mentioned above, is especially useful for reasons of cost and effectiveness. Such polyamines are described in detail in the above-cited "Encyclopedia of Chemical Technology", Second Edition, Volume 7, pages 22–93. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines. These mixtures are particularly useful in preparing the carboxylic acid reagents of this invention. On the other hand, quite satisfactory products can also be obtained by the use of pure alkylene polyamines.

Hydroxyalkyl-substituted alkylene polyamines, i.e., alkylene polyamines having one or more hydroxyalkyl substituents on the nitrogen atoms, likewise are useful in preparing the carboxylic acid reagents of this invention. Preferred hydroxyalkyl-substituted alkylene polamines are those in which the hydroxy alkyl group is a lower hydroxy alkyl group, i.e., having less than about 10 carbon atoms. Examples of such hydroxyalkyl-substituted polyamines include N-(2-hydroxyethyl)ethylene diamine, N,N'-bis(2-hydroxyethyl)ethylene diamine, 1-(2-hydroxyethyl)piperazine, monohydroxypropyl-substituted diethylene triamine, 1,4-bis(2-hydroxypropyl)piperazine, di-hydroxypropyl-substituted tetraethylene pentamine, N-(3-hydroxybutyl)-tetramethylene diamine, etc.

Higher homologs such as are obtained by condensation of the above-illustrated alkylene amines or hydroxy alkylsubstituted alkylene amines through amino radicals or through hydroxy radicals as well as mixtures of the above are likewise useful.

Useful carboxylic acid reagents can also be prepared from hydrazine or an organo-substituted hydrazine of the general formula

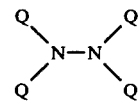

wherein each Q is independently hydrogen or a $C_1$-$C_{30}$ hydrocarbon-based group. Generally, at least one Q is a hydrogen atom and the other Q groups are $C_1$-$C_{10}$ aliphatic groups. More preferably at least two Q groups are hydrogen. Most preferably, at least two Q groups are hydrogen and the remaining Q groups are alkyl of up to ten carbon atoms.

Examples of substituted hydrazines are methylhydrazine, N,N-dimethylhydrazine, N,N'-dimethylhydrazine, phenylhydrazine, N-phenyl-N'-ethylhydrazine, N-(p-tolyl)-N'-(n-butyl)hydrazine, N-(p-nitrophenyl)-N-methylhydrazine, N,N'-di-(p-chlorophenyl)hydrazine, N-phenyl-N'-cyclohexylhydrazine, etc.

Useful carboxylic acid reagents can also be prepared from hydroxylamine or hydrocarbyl substituted hydroxylamine analogs of the general formula:

wherein the Q groups have the same meaning described above and the same preferences are used in choosing them.

Preferred amino compounds for preparation of the nitrogen-containing carboxylic acid reagents of this invention are lower amines having 1 to 2 amino groups or 1 amino and 1 hydroxyl group and a total of up to 7 carbon atoms per molecule, ammonia, hydrazine, hydroxylamine, and lower hydrazines and hydroxylamines having a total of up to 7 carbon atoms and a total of up to 2 nitrogen atoms per molecule.

In addition to ammonia, hydrazine and hydroxylamine, or analogs thereof, suitable inorganic salts which yield free hydrazine or hydroxylamine under the reaction conditions may also be used, such as hydrazine sulfate and hydroxylamine hydrochloride.

Mixtures of two or more of the afore-described amino compounds can also be used in making the compositions of this invention. It is preferred that the amino compounds used have at least one H—N= linkage within their structure.

In the preferred carboxylic acid reagents (II) the halogen is chlorine or bromine, the carboxyl-based group Cox is selected from the group consisting of carboxylates of Group IA metals (particularly chloroacetate salts), esters of lower alkanols (particularly chloroacetate esters), carboxamides of lower alkyl monoamines and ammonia, and carboxylates of lower alkyl monoamines and ammonia.

Among the particularly preferred carboxylic acid reagents used to produce the compositions of this invention are alpha-halo carboxyl acid reagents having 2 to 20 carbon atoms and being aliphatic- or alicyclic-based, especially those in which Cox is an ester group of a lower alkanol. Exemplary of such carboxylic acid reagents are:

chloroacetic acid
ethyl chloroacetate
methyl-7-bromo stearate
sodium 1,1-di-chloropropionate
di(methyl)-1-chlorosuccinate
potassium phenyl chloroacetate
di(tetramethyl ammonium)-bromomalanate
calcium-bromo succinate
2-chloro-cyclohexanoic acid methyl ester
3-chloro glutaric acid
hexyl-4-chloro hexanoate
8-chloro-methyl stearate
mono-chloroacetic acid ester of pentaerythritol
3-bromobutyramide
sodium chloroacetate
ethyl, naphthyl bromoacetate
chlorosuccinic anhydride
etc.

Other appropriate halo carboxylic acid reagents within the scope defined hereinbelow will readily occur to those skilled in the art.

Normally, the compositions of this invention are made by reacting an equivalent of phenoxide metal salt with an equivalent of carboxylic acid reagent. An equivalent of phenoxide is determined by dividing the phenoxide molecular weight by the number of phenoxide (i.e., metal-neutralized aryl hydroxide) groups present. For example, disodium bisphenol A phenoxide has two equivalents per mole, the mono lithium salt of hydroquinone phenoxide has one equivalent per mole, etc. An equivalent of carboxylic acid reagents is determined similarly by dividing the reagent molecular weight by the number of aliphatic halogen atoms present. When only one such halogen is present in the carboxylic acid reagent the reagent's molecular weight is also its equivalent weight. While one to one equivalent proportions mentioned are normally used, in certain circumstances (e.g., where it is desired to drive the reaction forward rapidly), it is possible to use up to a five-fold excess (in terms of equivalents) of the acid reagent per equivalent of phenoxide. It is also possible to use up to the molecular weight of the phenoxide salt. Thus reactant ratio of acid reagent to phenoxide ranges between about 1:20 to 5:1 acid reagent: phenoxide salt. Mixtures of two or more acid reagents and/or phenoxide reagents can also be used.

The reaction of phenoxide metal salt and carboxylic acid reagent takes place at temperatures ranging between about 15° C. to the decomposition temperature of the reaction component having the lowest decomposition temperature. Usually it is not necessary to carry out the reaction at a temperature in excess of about 300° C. Usually the lowest reaction temperature is about 50° C. and the highest reaction temperature is about 200° C.

The reaction occurs normally in about 0.1–24 hours. The shortest reaction time is usually about 0.25 hours and the longest about 10 hours.

The reaction is often preferably carried out in the presence of a substantially inert, normally liquid solvent/diluent such as a relatively low boiling petroleum cut such as naphtha, textile spirits, reformate, petroleum ether, kerosene, gasoline, diesel fuel, etc., having a 90% boiling point of less than about 250° C. at 1 torr. Other organic solvents such as lower alkanols, glycols, benzene, xylenes, toluene, octanes, tetrahydrofuran, pyridine, ethylene glycol ethers (e.g., the commercial products sold under the trade names cellosolves and diglymes) etc., can be used as the inert solvent/diluent. Often it is desirable to use one or more of the lubricating oils described hereinbelow as an inert solvent/diluent for the reaction of the phenoxide and carboxylic acid reagent.

Recovery of the product from the phenoxide metal salt/carboxylic acid reagent can be accomplished by means well known to those skilled in the art such as distillation, crystallization, precipitation, dialysis, absorbtion, etc. Often it is not necessary to recover the product if it is to be post-treated as described hereinbelow. Sometimes when the carboxylic acid reagent is a salt it is convenient to neutralize the product by the addition of an inorganic protonic acid (e.g., $H_2SO_4$, $H_3PO_4$, HCl, $HNO_3$, etc.) before recovering or post-treating the product.

It is believed that the compositions of this invention formed by reaction of the metal phenoxide I and the carboxylic acid reagent II have predominance of ether linkages resulting from displacement of the halogen atom of the carboxylic acid reagent with a phenoxide anion. This belief is supported by the observation that significant amounts of metal halide by-products are formed during the reaction of I with II. The invention, however, is in no way limited to such ether compositions and relatively low amounts of products having other molecular structures may be present in the compositions of this invention.

The following are specific illustrative examples of how to make the aforesaid invention and include the best mode of the inventions presently known. In these examples, as well as this specification and appended claims, all percentages and parts are by weight and the molecular weights are number average molecular weights ($\overline{M}n$) as determined by gel permeation chromatography (GPC) or vapor phase osmometry (VPO).

EXAMPLE 1

A mixture of 1120 parts of a poly(isobutene)-substituted phenol ($\overline{M}n$ 960 VPO), 200 parts of xylene, 300 parts of mineral oil and 14 parts of 50% aqueous sodium hydroxide solution is heated at 75° C. At 78° C., 29.7 parts of paraformaldehyde is added, and the reaction mixture is heated at reflux for 2.5 hours. An additional 66 parts of 50% aqueous sodium hydroxide solution is added, and the mixture dried by azeotropic distillation. At 73° C., 110 parts of ethyl chloroacetate is added and the mixture is held at 130°–147° C. for 2.5 hours. At 60° C., 100 parts of a commercial mixture of alcohols containing approximately 61% isobutyl alcohol and 39% amyl alcohol, 10 parts of aqueous hydrochloric acid and 30 parts of water is added. The mixture is refluxed at 105°–107° C. for one hour, then azeotropically dried. The mixture is stripped to 170° C. under vacuum and filtered. The filtrate contains the desired product and 19.9% mineral oil.

EXAMPLE 2

A mixture of 412 parts of the product mixture of Example 1 and 55 parts of a 39.5% aqueous solution of tris(hydroxymethyl)amino methane is heated at 140°–152° C. for nine hours, then stripped at 166° C. under vacuum and filtered. The filtrate contains the product and has a nitrogen content of 0.59%.

EXAMPLE 3

A mixture of 782 parts (0.5 equivalent) of the product solution of Example 1, 276 parts of mineral oil and 30.7 parts (0.75 equivalent) of a commercial ethylene polyamine mixture, wherein the amines have an average of three to ten nitrogen atoms per molecule, containing about 34% nitrogen is heated at 160°–165° C. for five hours. The mixture is stripped to 170° C. under vacuum and filtered to yield an oil solution containing 0.97% nitrogen

EXAMPLE 4

A mixture of 2366 parts of a poly(isobutene)-substituted phenol ($\overline{M}n$ 1369 VPO), 350 parts of toluene and 41.5 parts of paraformaldehyde is heated at 79° C. At 85° C., 56 parts of 50% aqueous sodium hydroxide solution is added and the reaction mixture is heated at reflux for three hours. The mixture is then dried by azeotropic distillation. At 142° C., 86 parts of ethyl chloroacetate is added and the reaction mixture is cooled to 80° C., whereupon 250 parts of a commercial mixture of alcohols described in Example 1, 25 parts of aqueous hydrochloric acid and 60 parts of water are added. The reaction mixture is refluxed at 89°–91° C. for four hours, then azeotropically dried. The mixture is stripped to 170° C. under vacuum and 1000 parts of mineral oil is added. The product solution, which contains 29.1% mineral oil, is obtained by filtration.

EXAMPLE 5

A mixture of 1601 parts (0.28 equivalent) of the product solution of Example 4, 290 parts of mineral oil and 17.3 parts (0.42 equivalent) of the commercial ethylene polyamine mixture described in Example 3 is heated at 165°–190° C. for seven hours, then filtered to obtain the desired product solution (60% solution in mineral oil, containing 0.29% nitrogen).

EXAMPLE 6

A mixture of 5600 parts of a poly(isobutene)-substituted phenol ($\overline{M}n$ 885 VPO), 1600 parts of xylene and 80 parts of 50% aqueous sodium hydroxide solution is heated at 65° C. At 67° C., 148.5 parts of paraformaldehyde is added and the reaction mixture is heated at reflux for four hours. A charge of 171 parts of flake sodium hydroxide and 60 parts of water is made to the reaction mixture at 82° C. and then dried by azeotropic distillation. At 70° C., 750 parts of a commercial mixture of alcohols described in Example 1 and then 524 parts of sodium chloroacetate are added and the mixture is held at reflux (124°–126° C.) for 10.5 hours. The mixture is stripped to 168° C. and 1000 parts of mineral oil is added. At 98° C., 500 parts of aqueous hydrochloric acid and 100 parts of water are added to the reaction mixture, which is refluxed for 2.5 hours followed by azeotropic distillation. The mixture is stripped to 170° C. under vacuum and 1200 parts of mineral oil is added. The desired product solution (containing 27.1% mineral oil) is obtained upon filtration.

EXAMPLE 7

A mixture of 912 parts of the oil-containing product solution of Example 6, 250 parts of mineral oil and 27.2 parts (0.8 equivalent) of pentaerythritol is heated at 175°–210° C. for three hours, then at 222°–230° C. for 4.5 hours. The mixture is stripped at 230° C. under vacuum and filtered to yield an oil solution of the desired product solution (58% in mineral oil).

EXAMPLE 8

A mixture of 912 parts of the oil-containing product solution of Example 6, 200 parts of mineral oil and 68 parts (2.0 equivalents) of pentaerythritol is reacted according to the procedure in Example 7 to yield a 60% solution of the desired product in mineral oil.

EXAMPLE 9

A mixture of 912 parts of the oil-containing product solution of Example 6, 200 parts of mineral oil and 36.3 parts (0.3 mole) of tris(hydroxymethyl)aminomethane is heated at 220°–225° C. for six hours, then stripped at 160° C. under vacuum and filtered. The filtrate is an oil solution of the product containing 0.34% nitrogen.

EXAMPLE 10

A mixture of 912 parts of the oil-containing product of Example 6, 150 parts of mineral oil, 150 parts of toluene and 57.6 parts of 3-aminopropyl morpholine is heated at 141°–161° C. for 9.5 hours, then stripped to 169° C. under vacuum. Filtration yields a 64% solution in mineral oil, containing 0.96% nitrogen, as the desired product solution.

EXAMPLE 11

A mixture of 912 parts of the oil-containing product of Example 6, 170 parts of mineral oil, 150 parts of toluene and 24.6 parts (0.6 equivalent) of the commercial ethylene polyamine mixture used in Example 5 is heated at 134°–149° C. for six hours, then stripped to 161° C. under vacuum and filtered to yield the desired product solution (62% solution in mineral oil) containing 0.76% nitrogen.

EXAMPLE 12

A mixture of 912 parts of the oil-containing product solution of Example 6, 150 parts of toluene, 150 parts of mineral oil and 33.2 parts (0.8 equivalent) of a commercial ethylene polyamine mixture corresponding in empirical formula to pentaethylene hexamine is reacted according to the procedure set forth in Example 11. The product solution contains 36.5% mineral oil and 0.99% nitrogen.

EXAMPLE 13

A mixture of 2205 parts of the oil-containing product solution of Example 6, 518 parts of mineral oil, 250 parts of toluene and 82 parts (2.0 equivalents) of a commercial ethylene polyamine mixture used in Example 5 is reacted according to the procedure used in Example 11. The product solution obtained contains 40% mineral oil and 0.98% nitrogen.

EXAMPLE 14

A mixture is prepared by the addition of 22 parts of carbon disulfide over a period of three hours to 1100 parts of the amide prepared in Example 13 at 128°–130° C. The reaction mixture is held at 160°–165° C. for six hours under nitrogen. Filtration yields a product containing 39.2% mineral oil, 0.53% sulfur and 0.98% nitrogen.

EXAMPLE 15

A mixture of 882 parts of the oil-containing product of Example 6, 205 parts of mineral oil and 30.7 parts (1.0 equivalent) of glycerol is heated at 195°–210° C. for twelve hours under nitrogen. The mixture is stripped to 225° C. under vacuum and filtered. The filtrate is the desired product solution (60% solution in mineral oil).

EXAMPLE 16(A)

A mixture is prepared by the addition of 60 parts of aqueous hydrochloric acid to 3880 parts of a poly(isobutene)-substituted phenol ($\overline{M}n$ 885 VPO), 1500 parts of xylene and 108 parts of paraformaldehyde at 75° C. The reaction mixture is dried by azeotropic distillation to yield 5231 parts of the desired product solution.

EXAMPLE 16(B)

A mixture of 3160 parts of the product solution of Example 16, 100 parts xylene and 93 parts (2.25 equivalents) of sodium hydroxide is heated to reflux and azeotropically dried. The resulting phenoxide-containing mixture is cooled to 85° C. and 233 parts (2.0 equivalents) of sodium chloroacetate is added followed by the addition of 500 parts of a commercial mixture of alcohols described in Example 1. The mixture is held at reflux (119°–120° C.) for 6.5 hours and then stripped to 169° C. under nitrogen. After cooling the mixture to about 75° C., 400 parts of water, 300 parts of textile spirits and 450 parts of aqueous hydrochloric acid are added. The reaction mixture is stripped to 105° C. in four hours, refluxed at 105°–110° C. for four hours and then stripped to 174° C. under vacuum. Diluent oil, 500 parts, is added and the mixture is filtered to yield 3178 parts of an oil solution of the desired product.

EXAMPLE 17

A mixture of 862 parts of the oil-containing product solution of Example 16(B), 150 parts of mineral oil, 200 parts of toluene and 21.5 parts (0.525 equivalent) of the commercial ethylene polyamine mixutre used in Example 5 is reacted according to the procedure described in Example 11. The product solution obtained contains 39% mineral oil and 0.72% nitrogen.

EXAMPLE 18

A mixture is prepared by the addition of 24 parts of aqueous hydrochloric acid to 798 parts of tetrapropenylsubstituted phenol, 300 parts of xylene and 45 parts of paraformaldehyde at 65° C. The reaction mixture is held at 100°–107° C. for three hours, then dried by azeotropic distillation. The reaction mixture is cooled to 35° C. and 256 parts of 50% aqueous sodium hydroxide solution is added. The mixture is heated to reflux and azeotropically dried. At 62° C., 130 parts of toluene, 360 parts of a commercial mixture of alcohols described in Example 1 and 349.5 parts (3.0 equivalents) of sodium chloroacetate are added. The mixture is refluxed at 114° C. for 7.5 hours, stripped to 162° C. and then 550 parts of mineral oil is added. After cooling to 120° C., 400 parts of toluene, 500 parts of aqueous hydrochloric acid and 250 parts of water are added. The mixture is stirred at 65° C. for three hours, stripped to 101° C., azeotropically dried and then stripped to 165° C. under vacuum. Filtration yields the desired oil-containing product solution.

EXAMPLE 19

A mixture of 385 parts of the oil-containing product solution of Example 18, 50 parts of mineral oil, 75 parts of toluene and 43 parts (1.05 equivalents) of the ethylene polyamine mixture used in Example 5 is reacted according to the procedure described in Example 11. The product solution contains 40% mineral oil and 3.06% nitrogen.

EXAMPLE 20

A mixture is prepared by the addition of 19 parts of para-toluenesulfonic acid to 5600 parts of a poly(isobutene)-substituted phenol ($\overline{M}n$ 885 VPO), 1600 parts of xylene, 1200 parts of diluent oil and 148.5 parts (4.5 equivalents) of paraformaldehyde at 65° C. The reaction mixture is heated at reflux for three hours, then cooled to 95° C. and 216 parts (5.2 equivalents) of sodium hydroxide is added. The mixture is heated to reflux and dried by azeotropic distillation. The resulting phenoxide-containing mixture is cooled to 85° C. and 760 parts of a commercial mixture of alcohols described in Example 1 is added followed by the addition of 524 parts (4.5 equivalents) of sodium chloroacetate. The mixture is held at reflux (124°–126° C.) for seven hours and then stripped to 172° C. under nitrogen. After cooling to about 99° C., 250 parts of water, 1000 parts of mineral oil and 500 parts of aqueous hydrochloric acid are added. The reaction mixture is stripped to 163° C. under vacuum and filtered to yield 7384 parts of the desired oil-containing product solution.

EXAMPLE 21

A mixture of 890 parts of the oil-containing product solution of Example 20 and 150 parts of mineral oil is heated to 100° C. and 26 parts of ethylene oxide is added over 1.4 hours. The reaction mixture is stripped to 224° C. under vacuum, then filtered to yield the desired ester in 63% solution mineral oil.

EXAMPLE 22

The procedure for Example 10 is repeated except the product of Example 6 is replaced on an equivalent basis by the product of Example 20.

EXAMPLE 23(A)

A mixture of 5300 parts of tetrapropenyl-substituted phenol, 820 parts of sodium hydroxide and 2203 parts of mineral oil is heated to 160° C. and dried under nitrogen. At 160° C., 1030 parts of sulfur dichloride is added slowly. The reaction mixture is held at 160° C. for one hour under nitrogen to yield the desired product solution.

EXAMPLE 23(B)

A mixture of 5376 parts of the oil-containing product solution of Example 23, 750 parts of xylene and 249 parts of sodium hydroxide is dried by azeotropic distillation. At 70° C., 699 parts of sodium chloroacetate and 1200 parts of a commercial mixture of alcohols described in Example 1 are added and the mixture is held at reflux (125° C.) for seven hours. At 100° C., 1000 parts of toluene, 588 parts of aqueous hydrochloric acid and 1000 parts of water are charged and the reaction mixture is again refluxed for one hour and then stripped to 160° C. under vacuum. The desired oil-containing product solution is obtained by filtration.

EXAMPLE 24

A mixture of 422 parts of the oil-containing product solution of Example 23(A), 200 parts of xylene and 72 parts of 3-aminopropyl morpholine is heated at reflux for two hours, then stripped to 150° C. under vacuum. Filtration yields the desired product solution containing 23% mineral oil, 2.59% nitrogen and 3.15% sulfur.

EXAMPLE 25

A mixture of 2688 parts of the oil-containing product solution of Example 23(A), 500 parts of xylene and 251 parts of sodium hydroxide is dried by azeotropic distillation. At 70° C., 699 parts of sodium chloroacetate followed by 1200 parts of a commercial mixture of alcohols described in Example 1 are added and the mixture is held at reflux (130° C.) for eight hours. The mixture is stripped to 150° C. under vacuum. At 90° C., 1000 parts of water, 1000 parts of toluene, and 588 parts of aqueous hydrochloric acid are added to the reaction mixture, which is refluxed for one hour, followed by stripping to 155° C. under vacuum. The desired product solution (containing 2.52% sulfur) is obtained by filtration.

EXAMPLE 26

A mixture of 456 parts of the oil-containing product solution of Example 25, 200 parts of xylene and 101 parts of 3-aminopropyl morpholine is reacted according to the procedure described in Example 24. The oil-containing product solution obtained contains 3.59% nitrogen and 2.29% sulfur.

EXAMPLE 27

A mixture of 3584 parts of the oil-containing product solution of Example 23(A), 800 parts of xylene and 336 parts of sodium hydroxide is dried by azeotropic distillation. At 130° C., 981 parts of ethyl chloroacetate and 600 parts of a commercial mixture of alcohols described in Example 1 are added and the mixture is held at reflux for one hour, stripped to 150° C. under nitrogen, and filtered. The filtrate, containing 3.11% sulfur, is the desired product solution.

EXAMPLE 28

A mixture of 2774 parts of the oil-containing product solution of Example 27 and 300 parts of hydrazine monohydrate is stripped to 150° C. under vacuum and filtered yielding the desired product solution.

EXAMPLE 29

A mixture of 5376 parts of the oil-containing product solution of Example 23(A), 1125 parts of mineral oil, 800 parts of xylene and 480 parts of 37% aqueous formalin solution is heated to 65° C. At 70° C., 252 parts of sodium hydroxide is added and the reaction mixture is dried by azeotropic distillation. At 140° C., 735 parts of ethyl chloroacetate is added and the mixture is held at reflux for three hours, then stripped to 150° C. under vacuum and filtered. The filtrate is the desired product solution (63% solution in mineral oil, containing 3.23% sulfur).

EXAMPLE 30

A mixture of 950 parts of the solution described in Example 29, 200 parts of mineral oil, 60 parts of polybutenyl succinic anhydride ($\overline{M}n$ 1000), 44 parts of calcium hydroxide, 250 parts of a commercial mixture of alcohols described in Example 1, and 120 parts of water is heated at reflux for one hour then stripped to 150° C. under nitrogen. After cooling to 60° C., 628 parts of methanol, 20 parts of acetic acid and 119 parts of calcium hydroxide are added. The reaction mixture is then blown with carbon dioxide at 1 cfh for 1.5 hours. The mixture is stripped to 150° C. under vacuum and filtered to yield an oil solution of the overbased desired product.

EXAMPLE 31

A mixture of 2240 parts of a poly(isobutene)-substituted phenol ($\overline{M}n$ 885 VPO), 650 parts of xylene, 750 parts of mineral oil and 83.4 parts of sodium hydroxide is dried by azeotropic distillation. Sulfur dichloride (103 parts) is added at 146°-151° C. in two hours. The reaction mixture is heated at 151°-153° C. for one hour, then cooled to 98° C. whereupon 83.4 parts of sodium hydroxide and 26.4 parts of paraformaldehyde are added. The reaction mixture is azeotropically dried. At 90° C., 500 parts of a commercial mixture of alcohols described in Example 1 followed by 210 parts of sodium chloroacetate are added and the mixture is held at reflux (122°-134° C.) for 5.5 hours. The mixture is stripped to 154° C. and then cooled to 98° C. whereupon 200 parts of toluene, 100 parts of water and 205 parts of aqueous hydrochloric acid are added. The reaction mixture is refluxed for two hours, dried by azeotropic distillation, stripped to 173° C. under vacuum and filtered to yield 2770 parts of the desired product solution (containing 23.9% mineral oil).

EXAMPLE 32

A mixture of 844 parts of oil-containing product solution of Example 31, 200 parts of mineral oil, 150 parts of toluene and 24.6 parts of the commercial ethylene polyamine mixture used in Example 5 L is reacted according to the procedure described in Example 11. The product solution obtained contains 38% mineral oil and 0.78% nitrogen.

EXAMPLE 33

A mixture of 844 parts of the oil-containing product solution of Example 31, 160 parts of mineral oil, 150 parts of toluene and 57.6 parts of 3-aminopropyl morpholine is reacted according to the procedure described in Example 10. The product solution obtained contains 34% mineral oil, 1.01% nitrogen, and 0.89% sulfur.

EXAMPLE 34

The procedure of Example 1 is repeated except the ethyl chloroacetate is replaced by an equimolar amount of diethyl chlorosuccinate.

EXAMPLE 35

The procedure of Example 23(A) is repeated except that the product of Example 23 is replaced by an equimolar amount of 2,2'-dihydroxybiphenyl alkylated with Pbu ($\overline{M}n$ 1000 VPO) using a Friedel-Crafts catalyst.

The compositions of this invention are useful in and of themselves as anti-rust and anti-corrosion agents for fuels and lubricants, particularly when they are free acids, esters of the afore-described higher alcohols, carboxiamides or ammonium carboxylates of the afore-described polyamines. These esters, carboxamides and carboxylates can also function in fuels and lubricants as detergents and dispersants for sludge and varnish formed in internal combustion engines. Thus, fuel and lubricant compositions are within the scope of the invention herein disclosed.

The compositions of this invention can be employed in a variety of lubricants based on diverse oils of lubricating viscosity, including natural and synthetic lubricating oils and mixtures thereof. These lubricants include crankcase lubricating oils for spark-ignited and compression-ignited internal combustion engines, such as automobile and truck engines, two-cycle engines, marine and railroad diesel engines, and the like. They can also be used in gas engines, stationary power engines, turbines and the like. Automatic transmission fluids, transaxle lubricants, gear lubricants, metal-working lubricants, hydraulic fluids and other lubricating oil and grease compositions can also benefit from the incorporation therein of the compositions of the present invention.

Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene gylcol having a molecular weight of 500-1000, diethyl ether of polypropylene glycol having a molecular weight of 1000-1500, etc.) or mono- and polycarboxylic esters thereof, for example, the acetic acid esters, mixed $C_3$-$C_8$ fatty acid esters, or the $C_{13}$Oxo acid diester of tetraethylene glycol.

Another suitable class of synthetic lubricating oils comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkly-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)silicate, tetra(p-tert-butylphenyl)silicate, hexyl-(4-methyl-2-pentoxy)-disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those of skill in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

In general, about 0.05-20.0, preferably 0.1-10 parts (by weight) of a composition of this invention is dissolved or stably dispersed in 100 parts of oil to produce a satisfactory lubricant. The invention also contemplates the use of other additives in combination with the composition of this invention. Such additives include, for example, auxiliary detergents and dispersants of the ash-producing or ashless type, oxidation inhibiting agents, pour point depressing agents, extreme pressure agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., poly(isobutene) having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly empolyed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, $C_{6-26}$ alkylpenols, thiophenol, sulfurized alkylphenol, and condensation products of formaldehyde with a phenolic substance; $C_{1-20}$ alcohols such as methanol, 2-propanol, octyl alcohol, cellosolve, carbitol, ethylene glycol, stearyl alcohol, and cyclohexyl alcohol; and $C_{1-20}$ amines such as aniline, phenylenediamine, phenothiazine, phenyl-$\beta$-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60–200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen-containing compounds such as amines, organic hydroxy compounds such as phenols and alcohols, and/or inorganic materials. Examples of these "carboxylic dispersants"0 are described in British Patent 1,306,529 and in many U.S. Patents, including the following:

| | | |
|---|---|---|
| 3,163,603 | 3,351,552 | 3,541,012 |
| 3,184,474 | 3,381,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | Re 26,433 |
| 3,346,493 | 3,522,179 | |

(2) Reaction products of relatively high molecular weight aliphatic or alicyclic halides with amines, preferably polyalkylene polyamines. These may be characterized as "amine dispersants" and examples thereof are described, for example, in the following U.S. Patents:

| | |
|---|---|
| 3,275,554 | 3,454,555 |
| 3,438,757 | 3,565,804 |

(3) Products obtained by post-treating the carboxylic or amine dispersants with such reagents as urea, thiourea, carbon disulfide, aldehydes, ketones, carboxylic acids, hydrocarbon-substituted succinic anhdyrides, nitriles, epoxides, boron compounds, phosphrous compounds or the like. Exemplary materials of this kind are described in the following U.S. Patents:

| | | |
|---|---|---|
| 3,036,003 | 3,367,943 | 3,579,450 |
| 3,087,936 | 3,373,111 | 3,591,598 |
| 3,200,107 | 3,403,102 | 3,600,372 |
| 3,216,936 | 3,442,808 | 3,639,242 |
| 3,254,025 | 3,455,831 | 3,649,229 |
| 3,256,185 | 3,455,832 | 3,649,659 |
| 3,278,550 | 3,493,520 | 3,658,836 |
| 3,280,234 | 3,502,677 | 3,697,574 |
| 3,281,428 | 3,513,093 | 3,702,757 |
| 3,282,955 | 3,533,945 | 3,703,536 |
| 3,312,619 | 3,539,633 | 3,704,308 |
| 3,366,569 | 3,573,010 | 3,708,522 |

(4) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. Patents:

| | |
|---|---|
| 3,329,658 | 3,666,730 |
| 3,449,250 | 3,687,849 |
| 3,519,565 | 3,702,300 |

The pertinent disclosures of all of the above-noted patents are incorporated by reference herein.

Extreme pressure agents and corrosion-inhibiting and oxidation-inhibiting agents are exemplified by chlorinated aliphatic hydrocarbons such as chlorinated wax; organic sulfides and polysulfides such as benzyl disulfide, bis-(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dpentyl phenyl phosphite, tridecyl phosphite, distearyl phosphite, dimethyl naphthly phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di (heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

The fuel compositions of the present invention contain a major proportion of a normally liquid fuel, usually a hydrocarbonaceous petroleum distillate fuel such as motor gasoline as defined by ASTM Specification D-439-73 and diesel fuel or fuel oil as defined by ASTM Specification D-396. Normally liquid fuel compositions comprising non-hydrocarbonaceous materials such as alcohol, ethers, organo-nitro compounds and the like (e.g., methanol, ethanol, diethyl ether, methyl ethyl ether, nitromethane) are also within the scope of this invention as are liquid fuels derived from vegetable or mineral sources such as corn, alfalfa, shale and coal. Normally liquid fuels which are mixtures of one or more hydrocarbonaceous fuels and one or more non-hydrocarbonaceous materials are also contemplated.

Examples of such mixtures are combinations of gasoline and ethanol, diesel fuel and ether, gasoline, and nitromethane, etc. Particularly preferred is gasoline, that is, a mixture of hydrocarbons having an ASTM boiling point of 60° C. at the 10% distillation point to about 205° C. at the 90% distillation point.

Generally, these fuel compositions contain an amount of the compositions of this invention sufficient to impart anti-rust, anti-corrosion and/or dispersant and detergent properties to the fuel; usually this amount is about 1 to about 10,000, preferably 4 to 1,000, parts by weight of the reaction product per million parts by weight of fuel. The preferred gasoline-based fuel compositions generally exhibit excellent engine oil sludge dispersancy and detergency properties. In addition, they exhibit anti-rust and corrosion-preventing properties.

The fuel compositions of this invention can contain, in addition to the compositions of this invention, other additives which are well known to those of skill in the art. These can include anti-knock agents such as tetraalkyl lead compounds, lead scavengers such as haloalkanes (e.g., ethylene dichloride and ehtylene dibromide), deposit preventors or modifiers such as triaryl phosphates, dyes, cetane improvers, anti-oxidants such as 2,6-di-tertiarybutyl-4-methylphenol, rust inhibitors, such as alkylated succinic acids and anhydrides, bacteriostatic agents, gum inhibitors, metal deactivators, demulsifiers, upper cylinder lubricants, anti-icing agents and the like.

In certain preferred fuel compositions of the present invention, the afore-described compositions of this invention are combined with other ashless dispersants in gasoline. Such ashless dispersants are preferably esters of a mono- or polyol and a high molecular weight mono- or polycarboxylic acid acylating agent containing at least 30 carbon atoms in the acyl moiety. Such esters are well known to those of skill in the art. See, for example, French Patent No. 1,396,645, British Patents Nos. 981,850 and 1,055,337 and U.S. Pat. Nos. 3,255,108; 3,311,558; 3,331,776; 3,346,354; 3,522,179; 3,579,450; 3,542,680; 3,381,022; 3,639,242; 3,697,428; 3,708,522; and British Patent Specification 1,306,529. These patents are expressly incorporated herein by reference for their disclosure of suitable esters and methods for their preparation. Generally, the weight ratio of the compositions of this invention to the aforesaid ashless dispersants is about 0.1 to about 10.0; preferably about 1 to about 10 parts of composition of this invention to 1 part ashless dispersant.

In still another embodiment of this invnetion, the inventive additives are combined with Mannich condensation products formed from substituted phenols, aldehydes, polyamines, and amino pyridines. Such condensation products are described in U.S. Pat. Nos. 3,649,659; 3,558,743; 3,539,633; 3,704,308; and 3,725,277.

The compositions of this invention can be added directly to the fuel or lubricating oil to form the fuel and lubricant composition of this invention or they can be diluted with a substantially inert, normally liquid organic solvent/diluent such as mineral oil, xylene, or a normally liquid fuel as described above, to form an additive concentrate which is then added to the fuel or lubricating oil in sufficient amounts to form the inventive fuel and lubricant composition described herein. These concentrates generally contain about 20 to about 90 percent of the composition of this invention and can contain in addition any of the above-described conventional additives, particularly the afore-described ashless dispersants in the aforesaid proportions. The remainder of the concentrate is the solvent/diluent.

As well as serving as additives in and of themselves, the compositions of this invention can be post-treated with a variety of chemical reagents to form post-treated compositions which are also useful as additives in the aforedescribed fuels and lubricants. These post-treated additives are used in concentrations having the same general ranges set forth above and can also be formulated into concentrated as described above. They can also be used with the compatible auxiliary additives already described.

When the compositions of this invention are to be used in post-treatment reactions, it is preferred that they are free carboxylic acids, anhydrides, esters of lower alcohols, carboxamides of ammonia, lower monoamines and carboxylates of ammonia, lower monoamines or metals, especially Group IA, IIA and IIB metals. The post-treatment reagents include the above-described higher mono- and polyhydric alcohols, especially the higher polyhydric alcohols and the above-described polyamines and hydroxy polyamines, especially the alkylene polyamines. Mixtures of these post-treating reagents can also be used. Particularly preferred are mixtures of the afore-described polyhydric triols and tetraols with the afore-described ethylene polyamines.

Reaction of the composition of this invention with the afore-described post-treating reagents is carried out under the same general conditions set forth hereinabove for reactions used to form the carboxylic acid reagents described above. Similarly, the general proportions set forth for forming the carboxylic acid reagent can be used in the post-treating reactions, thus, an equivalent of the composition of this invention can be reacted with 1–5 equivalents of the afore-described post-treating reagents. An equivalent of the composition of this invention is defined as its molecular weight divided by the number of carboxylic acid groups contained therein, i.e., carboxylic acid, anhydride ester, carboxamide, carboxylate group. An equivalent of a metallic post-treating reagent is its molecular weight or atomic weight divided by the valence. Thus, sodium, lithium, potassium, etc. have equivalent weights equal to their atomic weights while calcium, zinc and barium, etc., have equivalent weights which are half their atomic weights. The equivalent weight of a polyamine or polyhydric alcohol is its molecular weight divided by the number of hydroxyl and/or amino groups present.

The oils described hereinabove are particularly useful in solvent/diluents for post-treatment reactions, although the reactions can also be carried out without the presence of a solvent/diluent or in the presence of a solvent/diluent such as the relatively low boiling organic liquids set forth hereinabove in relation to the reactions used to form the carboxylic acid reagents.

The compositions of this invention can also be post-treated with a three and four membered ring heterocyle compound such as epoxides, episulfides, ethylene amines, oxytanes, azetanes, etc. Such post-treating reagents have the general formula

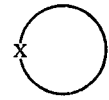

wherein the circle represents a chain of 2 to 3 carbon atoms and X represents an oxygen, sulfur or NQ group, Q being a hydrogen or a $C_{1-30}$ hydrocarbon-based group. Each of the carbon atoms in the circle can be substituted with hydrogen or a Q group as defined above, preferably, however, they are substituted with hydrogen and/or a single methyl group as in ethylene oxide, propylene oxide, etc. Post-treatments with the 3 and 4 membered ring heterocyle can be carried out in conditions well known to those of skill in the art. Generally, such post-treatments occur at temperatures between 0° C. and about 120° C. Preferably, they are carried out at temperatures of 15° C. to about 40° C. Such post-treatment and reactions can be carried out in a period as short as about 0.1 hour or as long as about 48 hours. Preferably, they are carried out in a period of about 1 to about 10 hours. At least about 0.5 mole to about 20 moles of heterocycle per equivalent of the composition of this invention is used in these post-treatment reactions. It is also possible to use mixtures of the 3 and 4 membered ring heterocylic post-treating reagents and mixtures of these heterocycle reagents with other post-treating reagents described hereinbefore.

Post-treatments of the products of this invention can also be carried out with reagents such as elemental sulfur, carbon oxy sulfide or carbon disulfide. Such post-treatments are carried out under the same general conditions as described hereinbefore with small ring heterocycle post-treatments and involve the same reactant proportions as the latter.

Compositions of this invention can also be overbased with Group IA, IIA and IIB basically reacting methyl compounds. Especially preferred compositions for such overbasing are those compositions containing a free carboxylic acid group or carboxylate metal or ammonium salt groups, and a hydroxyl group attached directly to an aromatic nucleus. These materials are analogous to the well-known overbased salicylate, which are described in U.S. Pat. No. 3,567,637; U.S. Pat. No. 2,258,591; and U.S. Pat. No. 2,252,662. Generally, the overbased compositions are made by reacting a carboxylate or carboxylic acid made according to this invention with a basically reacting metal oxide, hydroxide, alkoxide or phenoxide in the presence of an inorganic acidic material such as, for example, $CO_2$, $SO_2$, $H_2S$, HCl, etc. and a promotor such as, for example, water, lower alcohols and phenols, fatty carboxylic acids (e.g., acetic acid) and their salts and lower ketones and aldehydes. Generally, these overbasing reactions are carried out between about 25 and about 150° C. for about 0.25 to about 25 hours using about 2.5 to 30 moles of basically reacting metal compound to each equivalent of carboxyl compound (as defined hereinabove).

Further details as to making these overbased materials are generally known to those skilled in the art as is shown in the above-noted patents. Therefore, these patents are incorporated by reference for their teachings of how to overbase carboxylic acid compounds.

The following are examples of lubricating oil, fuel oil and concentrate compositions containing the compositions of this invention.

EXAMPLE A

A lubricating oil composition containing 2.5% of the oil solution described in Example 5.

EXAMPLE B

A gasoline suitable for use in automotive engines containing in addition to the conventional dye and anti-knock compounds, 0.001% of the oil solution described in Example 7.

EXAMPLE C

A diesel fuel containing in addition to a conventional anti-oxidant additive, 0.5% of the oil solution described in Example 5.

EXAMPLE D

A lubricating oil composition for gasoline engines graded 10W-40 according to SAE standards and having as a base oil a mixture of a solvent-refined 100 neutral and solvent-refined 200 neutral oil in equal amounts by volume and containing the following additives:

| Additive | Amounts |
|---|---|
| Polymeric VI Improver | 13% * |
| Zinc Dithiophosphate | 1.3% |
| Over-based Magnesium Sulfonate | 0.9% |
| Phenolic Anti-oxidant | 1.0% * |
| Sulfurized hydrocarbon E.P. Agent | 0.3% * |
| Ethoxylated Surfactant | 0.3% * |
| Carboxylic Acid Rust Inhibitor | 0.1% * |
| Silicone Anti-foamant | 100 ppm |
| Oil Solution Described in Example 19 | 5.5% |

The balance of the lubricant composition is the base oil.
* % by volume

EXAMPLE E

An additive concentrate suitable for formulating additive packages for use in fuels and lubricants comprising 50% of the oil solution of Example 19 and 50% of the base oil described in Example D.

What is claimed is:

1. An overbased metal carboxylate made by reacting at least one basically reacting metal compound in the presence of a promoter and an acidic reagent with at least one composition made by reacting (I) at least one phenoxide metal salt of a bridged phenol having (a) at least 2 and up to about 20 phenolic moieties or thiophenol analogs thereof and (b) at least 1 and up to about 19 bridging linkages independently selected from the group consisting of covalent carbon-to-carbon single bonds, ether linkages, sulfide linkages, polysulfide linkages of two to six sulfur atoms, sulfinyl linkages, sulfonyl linkages, methylene linkages, alkylene linkages, di(lower alkyl)methylene linkages, lower alkylene ether linkages, lower alkylene sulfide linkages, lower alkylene polysulfide linkages of two to six sulfur atoms, amino linkages, polyamino linkages and mixtures of said divalent bridging linkages with (II) at least one carboxylic acid reagent having 1 to about 3 carboxyl-based groups and a halogen-substituted hydrocarbon-based aliphatic or alicyclic group containing a halogen atom.

2. An overbased carboxylate composition as claimed in claim 1 wherein one or more of the phenolic phenol moieties are substituted with 1 to 3 hydrocarbon-based aliphatic or alicyclic groups from 1 to about 300 carbon atoms.

3. An overbased carboxylate composition as claimed in claim 2 wherein the phenoxide metal salt is of a Group IA, Group IIA, Group IIIA, Group IB or Group IIB metal or mixtures thereof.

4. An overbased carboxylate composition as claimed in claim 3 wherein the hydrocarbon-based group is purely hydrocarbyl and contains at least about 30 and up to about 250 carbon atoms.

5. An overbased carboxylate composition as claimed in claim 1 wherein the carboxylic acid reagent (II) is of the formula $$A\text{-}(Cox)_{1-3}$$

wherein A represents a halogen-bearing hydrocarbon-based aliphatic or alicyclic group of 1 to about 20 carbon atoms and each Cox independently represents a member selected from the group consisting of carboxylic, carboxyl and carboxamide.

6. An overbased carboxylate composition as claimed in claim 3 wherein the carboxylic acid reagent (II) is of the formula $$A\text{-}(Cox)_{1-3}$$

wherein A represents a halogen-bearing hydrocarbon-based aliphatic or alicyclic group of 1 to about 20 carbon atoms and each Cox independently represents a member selected from the group consisting of carboxylic, carboxyl and carboxamide.

7. An overbased carboxylate composition as claimed in claim 6 wherein the halogen is chlorine or bromine, the group Cox is selected from the group consisting of carboxylates of Group IA metals, carboxylic esters of lower alkanols, carboxamides of lower alkyl mono-amines and ammonia, and carboxylates of lower alkyl mono-amines.

8. An overbased carboxylate composition as claimed in claim 7 wherein the carboxylic acid reagent (II) is an ester of chloroacetic acid or a Group IA metal chloroacetate.

9. An overbased metal carboxylate made by reacting at least one basically reacting metal compound in the presence of a promoter and an acidic reagent with at least one composition made by reacting (I) at least one phenoxide metal salt of a bridged phenol of the general formula

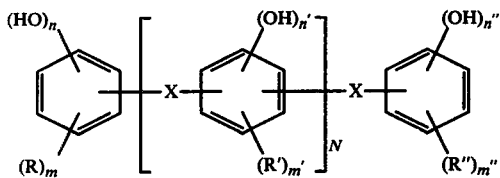

wherein n, n' and n'' are each independently integers of 1-3; R, R' and R'' are each independently aliphatic hydrocarbon-based groups of one to about 300 carbon atoms each; m, m' and m'' are each independently integers of 0-3; N is an integer of 0-20 and each X is a divalent bridging linkage selected from the group consisting of covalent carbon-to-carbon single bonds, ether linkages, sulfide linkages, polysulfide linkages of two to six sulfur atoms, sulfinyl linkages, sulfonyl linkages, methylene linkages, alkylene linkages, di(lower)methylene linkages, lower alkylene ether linkages, lower alkylene sulfide linkages, lower alkylene polysulfide linkages of two to six sulfur atoms, amino linkages, polyamino linkages and mixtures of said divalent bridging linkages, with (II) at least one carboxylic acid reagent of the formula $$A\text{-}(Cox)_{1-3}$$

wherein A represents a hydrocarbon-based aliphatic or alicyclic group containing at least one halogen atom and 1 to about 20 carbon atoms, each Cox independently representing a carboxyl-based group.

10. A composition as claimed in claim 9 wherein (I) is a salt of a Group IA or IIA metal, the bridging linkage X is a methylene linkage, sulfide linkage, methylene ether linkage or polysulfide linkage, the R groups are all the same, m, m' and m'', n, n' and n'' are each 1, the halogen is chlorine or bromine, and the group Cox is selected from the group consisting of carboxylates of Group IA and IIA metals, carboxylic esters of lower alkanols, carboxamides of lower alkyl mono-amines and ammonia and carboxylates of lower alkyl mono-amines and ammonia.

11. A lubricant composition comprising a major amount of at least one oil of lubricating oil viscosity and a minor amount of the composition claimed in claim 1.

12. A lubricant composition comprising a major amount of at least one oil of lubricating oil viscosity and a minor amount of the composition claimed in claim 2.

13. A lubricant composition comprising a major amount of at least one oil of lubricating oil viscosity and a minor amount of the composition claimed in claim 3.

14. A lubricant composition comprising a major amount of at least one oil of lubricating oil viscosity and a minor amount of the composition claimed in claim 4.

15. A lubricant composition comprising a major amount of at least one oil of lubricating oil viscosity and a minor amount of the composition claimed in claim 5.

16. A lubricant composition comprising a major amount of at least one oil of lubricating oil viscosity and a minor amount of the composition claimed in claim 6.

17. A lubricant composition comprising a major amount of at least one oil of lubricating oil viscosity and a minor amount of the composition claimed in claim 7.

18. A lubricant composition comprising a major amount of at least one oil of lubricating oil viscosity and a minor amount of the composition claimed in claim 8.

19. A concentrate comprising about 10 to about 90 percent of the composition claimed in claim 1 and a normally liquid organic solvent/diluent.

20. A concentrate comprising about 10 to about 90 percent of the composition claimed in claim 3 and a normally liquid organic solvent/diluent.

21. A concentrate comprising about 10 to about 90 percent of the composition claimed in claim 9 and a normally liquid organic solvent/diluent.

* * * * *